United States Patent
Sobeski et al.

(12)

(10) Patent No.: US 6,633,315 B1
(45) Date of Patent: *Oct. 14, 2003

(54) CONTEXT-BASED DYNAMIC USER INTERFACE ELEMENTS

(75) Inventors: David A. Sobeski, Redmond, WA (US); Felix G. T. I. Andrew, Seattle, WA (US); Michael D. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/315,578

(22) Filed: May 20, 1999

(51) Int. Cl.$^7$ .................................................. G06F 3/00
(52) U.S. Cl. ...................................... 345/762; 345/765
(58) Field of Search ................................ 345/765, 744, 345/762, 707, 806, 807, 853

(56) References Cited

U.S. PATENT DOCUMENTS

| | | | |
|---|---|---|---|
| 5,414,809 A | 5/1995 | Hogan et al. | |
| 5,785,418 A | 7/1998 | Hibbetts | |
| 5,905,492 A | * 5/1999 | Straub et al. | ................ 345/762 |
| 5,959,624 A | * 9/1999 | Johnston, Jr. et al. | ....... 345/763 |
| 5,961,602 A | 10/1999 | Thompson et al. | |
| 5,991,735 A | 11/1999 | Gerace | |
| 6,014,135 A | 1/2000 | Fernandes | |
| 6,072,486 A | * 6/2000 | Sheldon et al. | .............. 345/764 |
| 6,085,229 A | 7/2000 | Newman et al. | |
| 6,101,486 A | * 8/2000 | Roberts et al. | ................ 705/27 |
| 6,128,016 A | 10/2000 | Coelho et al. | |
| 6,141,010 A | 10/2000 | Hoyle | |
| 6,154,213 A | * 11/2000 | Rennison et al. | ............ 345/853 |
| 6,236,768 B1 | 5/2001 | Rhodes et al. | |
| 6,271,845 B1 | * 8/2001 | Richardson et al. | ......... 345/853 |
| 6,282,547 B1 | 8/2001 | Hirsch | |
| 6,327,574 B1 | 12/2001 | Kramer et al. | |
| 6,342,905 B1 | * 1/2002 | Diedrich et al. | ............. 345/746 |
| 6,405,159 B2 | 6/2002 | Bushey et al. | |

* cited by examiner

Primary Examiner—Cao Nguyen
(74) Attorney, Agent, or Firm—Woodcock Washburn LLP

(57) ABSTRACT

Methods and systems for building context-based user interfaces are provided. According to the present invention, a contextual engine residing on a host computer system provides a user interface based on a predefined set of user interface (UI) elements that are selected on the basis of a set of prescribed conditions being satisfied. The computer system includes a data store having a plurality of contexts, wherein each context is defined by a set of prescribed conditions and is associated with a predefined set of UI elements. The contextual engine determines, for each context, whether the set of prescribed conditions that defines the context is satisfied, and, if so, provides a user interface based on the predefined set of UI elements associated with the context. The contextual engine provides the user interface by identifying for an application program residing on the host computer system, the predefined set of UI elements associated with the context. The application builds the user interface based on the predefined set of UI elements associated with the context. The contextual engine continues running in the background on the host computer system and dynamically updates the user interface as long as the user is logged onto the host computer system.

17 Claims, 3 Drawing Sheets

CONTEXT-BASED DYNAMIC USER INTERFACE ELEMENTS

RELATED APPLICATIONS

The subject matter disclosed herein is related to the subject matter disclosed in copending application Ser. No. 09/315,447, filed on even date herewith, "Time-Based Dynamic User Interface Elements."

TECHNICAL FIELD

The present invention relates generally to the field of computer user interfaces, and more particularly to methods and systems for providing context-based user interfaces on a host computer system.

BACKGROUND OF THE INVENTION

The user of a computer typically communicates with the computer's operating system and applications via user interfaces (UIs) specifically designed for each operating system function or application. For example, an Internet browser will have a toolbar, drop down menus, a "favorites" list, and the like. In general, each UI is built from a set of UI elements that provide the application with the information needed to build the user interface. These elements provide information such as the user's "favorites" list, emailbox, toolbars, default directories, etc.

Typically, a user interface is built from the same set of elements every time the user runs a given application or operating system function or utility, unless the user manually changes one or more of the elements. For example, in connection with an Internet browser, the user may have a favorites list that includes Universal Resource Locators (URLs) for certain preferred Web sites the user accesses frequently. When the user initiates the browser residing on the host computer, the user interface that is built includes, among other things, the user's favorites list in a format the user can access and manipulate. The same favorites list is displayed every time the user initiates the browser and clicks on the "favorites" button on the toolbar. If, however, the user changes the favorites list during a particular session (e.g., adds, modifies, or deletes an entry in the favorites list), the changes are saved and, the next time the user initiates the browser and clicks on the "favorites" button, the new favorites list is displayed. Thus, the user interface for a particular application remains the same, independent of the location or role of the user, unless the user manually changes it.

It would be beneficial to the user, however, if the host computer system were to change the user interface dynamically depending on the "context" of the user experience. For example, a user may generally desire to access a certain set of Internet sites while in the office and a different set of sites while at home. In such a situation, it would benefit the user if the user were able to define an "at home" favorites list, for example, which, in general, would be different from his "at work" favorites list. In general, it would improve the user experience if the applications running on the host computer system were to build user interfaces based on elements that are selected to provide information specifically tailored to the needs of the user as the context of the user experience changes.

SUMMARY OF THE INVENTION

The present invention provides improved methods and systems for presenting information to the user of a host computer system. According to the invention, the user interface provided to the user is determined by the context of the current user experience. The context of the user experience can be based on, for example, the role the user is playing at a particular time or on a particular day (e.g., whether the user is expected to be working or relaxing), or the current location of the user (e.g., whether the user is most likely at home, at work, or roaming).

According to the present invention, a set of contexts is defined, each of which is associated with one or more user interface (UI) elements that can be used to build a user interface most suitable to that context. These UI elements include such information as user preferences, favorites lists, toolbars, default directories, etc. Each of the UI elements corresponds to one or more of the predefined contexts. When the user logs in, a contextual engine residing in the host computer determines the context of the current experience, and provides a user interface built from the UI elements associated with that context.

For example, the contextual engine of the present invention can determine whether the user is logged on via a dial-up connection (indicating that the user is, most likely, at home), or via a TCP/IP connection (indicating that the user is, most likely, at work). The contextual engine communicates with the host computer's operating system to determine certain information about the host computer. For example, the contextual engine can use an operating system API to determine whether the host computer is docked or undocked, whether an external hard drive is attached to the host computer, whether the user has connected to a network, etc. If the contextual engine determines that the user is at home, the favorites list, toolbars, default directories, etc., can be set to those associated with the context of the user's being "at home." If the contextual engine determines that the user is at work, on the other hand, the content provided corresponds to the context of the user's being "at work."

These and other features of the present invention are described in greater detail below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Overview

Figure 1:
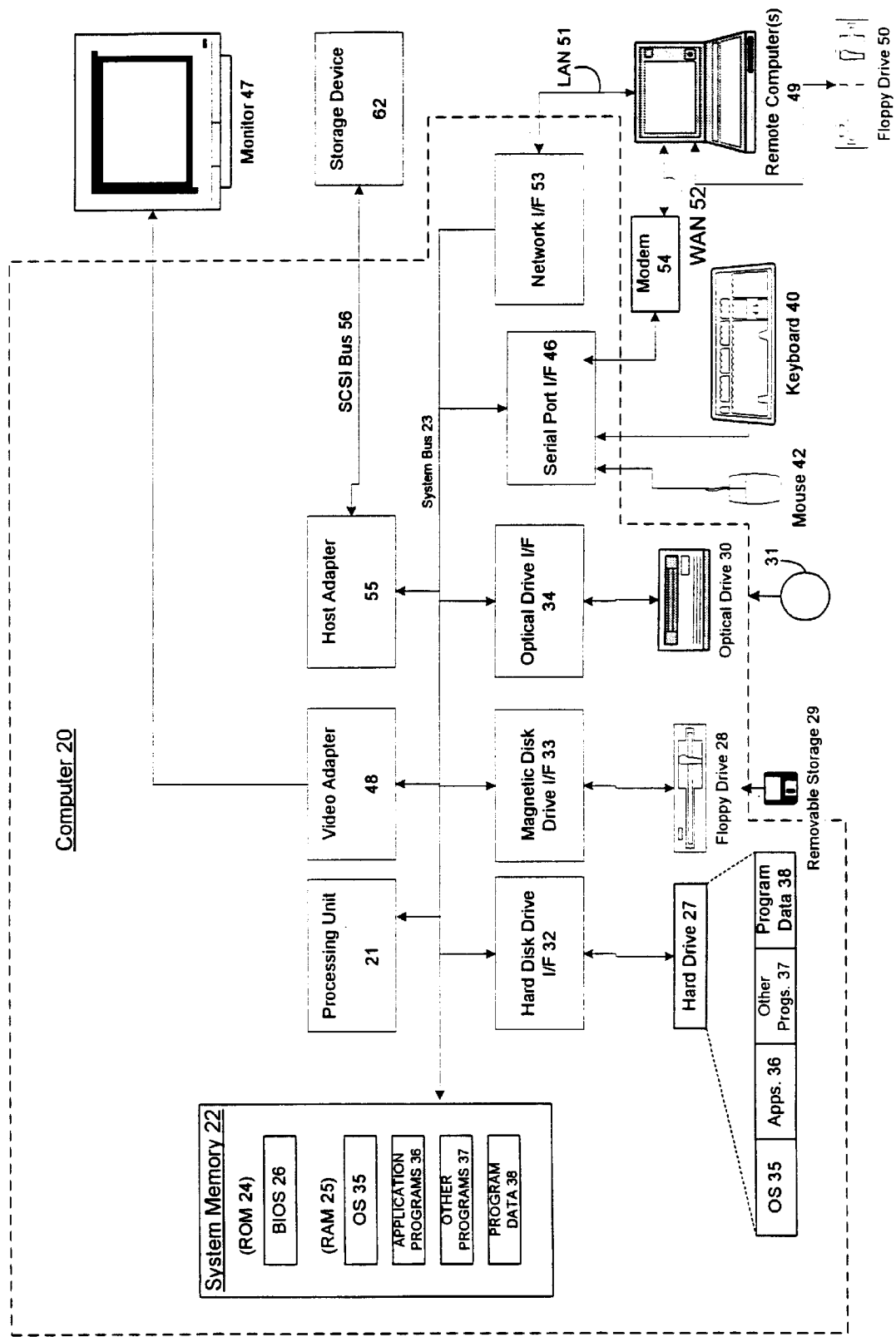
FIG. 1 is a block diagram representing a general purpose computer system in which aspects of the present invention may be incorporated.

The systems and methods of the present invention provide a mechanism for providing the user of a computer system with user interfaces based on the context of the current user experience. A contextual engine according to the present invention runs on a host computer system, such as a desktop computer, laptop computer, palm-size computer, etc., on which one or more applications can be run. Such computers can be operated on a stand-alone basis or connected to a network, such as local area network, wide area network, intranet, or the Internet. Moreover, such computers can be connected to a network via any number of well known wired or wireless media and network protocols. Before the user interface for an application is presented to the user, the contextual engine determines the "context" of the current user experience. The "context" of a user experience can be, for example, whether the user is at work, or at home, or working from home, whether it is morning, or the weekend, or summer; etc. In a presently preferred implementation of the invention, the "context" at any time is determined, with a suitable level of certainty, by assessing: whether the computer is connected to a network, the type of connection (if any), the time of day, and/or whether any other prescribed condition is met.

Once the contextual engine determines the context of the current user experience, the contextual engine identifies a set of UI elements from which the user interface should be built for the current context. The contextual engine passes these UI elements to the application, which builds the user interface. For example, the contextual engine might determine that the user is "at home." In this case, the contextual engine will identify elements that will cause the application to build a user interface that includes content that would be beneficial to the user's being at home. On the other hand, if the contextual engine determines that the user is "at work," the contextual engine identifies elements that will provide content that is more suitable to the user's being at work. Additionally, the contextual engine can identify different sets of elements at different times of day to provide the user with different user interfaces depending on the time of day.

To determine the current context of a user experience, the contextual engine consults a data store residing on the host computer. In a preferred embodiment, the data store can be a file, database, or the like, residing on the host computer that includes data corresponding to one or more contexts, each of which is defined by a set of one or more conditions. A context is a current context if all of the conditions corresponding to that context are satisfied. One or more UI elements are associated with each context in the data store. The contextual engine identifies these elements as the elements to be used to build the user interface whenever the context with which they are associated is the current context. If none of the contexts defined in the data store is the current context, the user interface is built using a set of default elements.

Basically, the contextual engine does a look-up at application boot time and is able to provide the appropriate UI elements to the application before the application is fully initialized. The application simply uses the UI elements provided to it and, thus, does not need to understand the current context. Preferably, the contextual engine is a "system" component, and performs all the necessary work at machine login time. It is anticipated that certain applications will initialize special instances of the contextual engine that understand, in greater detail, the actual application. Thus, the contextual engine can be extended by adding new rules to the engine to perform new tasks.

The present invention will now be explained in greater detail with reference to a presently preferred embodiment thereof First, a description of an exemplary computer environment is provided, and then a detailed description of the inventive methods and systems for building context-based user interfaces is provided.

Computer Environment

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB).

A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Methods and Systems for Providing a Context-based User Interface

Figure 2:
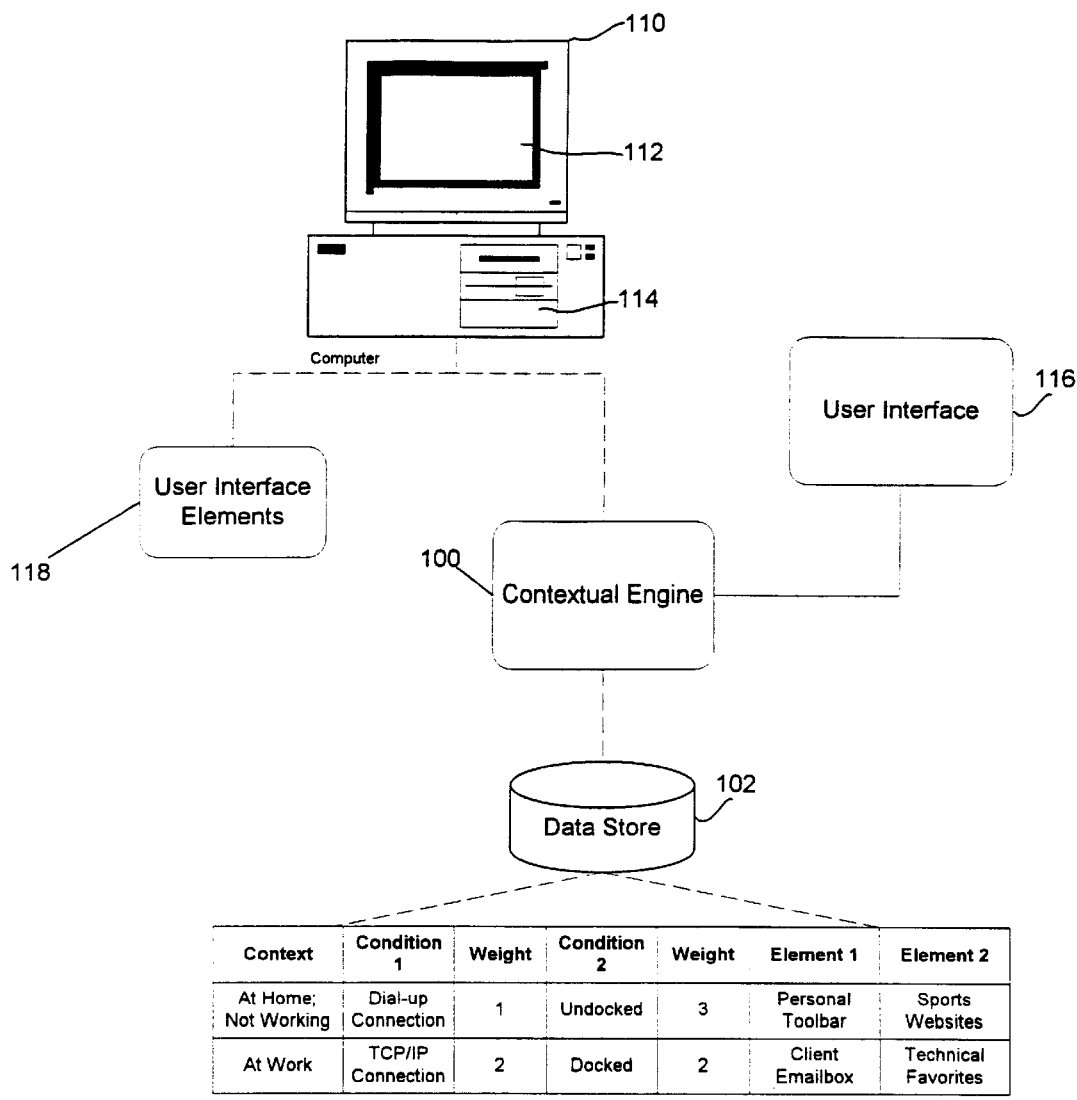
FIG. 2 is a schematic diagram of a host computer system used to build context-based user interfaces in accordance with the present invention.

FIG. 2 is a schematic diagram of a host computer system used to build context-based user interfaces in accordance with the present invention. As shown in FIG. 2, a host computer system 110, such as a personal computer, laptop computer, or the like, includes a video display terminal 112 and a hard drive 114. When a user logs onto the host computer system 110, a user interface 116 is displayed to the user on the video display terminal 112. The user interface 116 can be the user interface for any application that is currently running on the host computer system. For example, the user interface 116 can be the user interface to a word processor program, spreadsheet, Internet browser, etc.

The user interface 116 is built using one or more UI elements 118 that reside on the host computer system 110. Typically, these UI elements 118 reside on the computer's hard drive 114. The UI elements 118 can include, but are in no way limited to, elements that provide the user interface 116 with the user's "favorites" list, the user's emailbox, toolbars, preferences, etc. More generally, the UI elements 118 can be described as any elements that can be used to build any part of a user interface 114 for an application running on the host computer system 110.

The host computer system 110 also includes a contextual engine 100. Before the user interface 116 is presented to the user, the contextual engine 100 identifies the UI elements 118 that are to be used to build the user interface 116. According to the present invention, the user interface 116 is based on the context of the current user experience. Thus, the invention provides a mechanism to provide the user with the user interfaces and content that the user will likely need for the current experience given the user's current role. For example, when the user is at home, the user might require a user interface that displays different content from that which the user might require at work. On the other hand, if the user is at home and it is a weekday afternoon, the user might be working from home and require the "at work" content.

The user interface 116 is built, therefore, at least in part, from the UI elements 118 that the contextual engine 100 identifies based on the context of the current user experience. The context of the current user experience can be based on the location of the user (e.g., whether the user is at work, or at home, or roaming), or on the role of the user (e.g., whether the user is expected to be working or relaxing), etc.

The contextual engine 100 determines the context of the current user experience by accessing a data store 102 that resides on the host computer system 110, preferably on the computer's hard drive 114. The data store 102 includes one or more "contexts," each of which is defined by one or more conditions. For example, the data store 102 shown in FIG. 2 includes two contexts: "At Home; Not Working," and "At Work." Before the user interface 116 is presented to the user, the contextual engine 100 determines the context of the current user experience by determining whether the conditions that define one or more of the contexts are satisfied. If all the conditions that define a context are satisfied, then that context is determined to be the "current context" for that user experience.

The data store 102 also includes pointers to one or more elements associated with each context, and, for each context included in the data store 102, user interface elements associated with the context. Any number of contexts can be defined and, in a preferred embodiment of the present invention, the contextual engine 100 enables the user to define the contexts.

As shown in FIG. 2, the context of "at home; not working" is defined as whenever the user is undocked and connected to a network via a dial-up connection. The context of "at work" is defined as whenever the user is either docked or connected to a network via a TCP/IP connection. The contexts shown in FIG. 2, and the definitions therefor, are purely arbitrary and are provided for exemplary purposes only. Any number of contexts can be defined, based on any number or combination of conditions. For example, the context of "Monday Morning Quarterback" can be defined to be any Monday morning during football season, regardless of where the user is, or what the user is expected to be doing. This context might cause a user interface to be built that includes links to Web pages that include content related to football.

Once the contextual engine 100 determines the context of the current user experience, it determines from the data store 102 which UI elements 118 are associated with the current context. The contextual engine 100 maintains a reference to each active application so that the contextual engine can deliver the associated UI elements 118 to the application. The application then builds a user interface 116 using the UI elements 118 that the contextual engine 100 identified as being associated with the current context.

Consider an exemplary scenario wherein the user of an undocked laptop computer 110 connects to a network via a dial-up connection. The contextual engine 100 determines that the user is "undocked" and connected to the network via a dial-up connection. The contextual engine consults the data store 102 and determines that both conditions for the context of "at home; not working" are satisfied. The contextual engine 100 then determines from the data store 102 that the elements associated with the context "at home; not working" include the user's personal toolbars and a favorites list that includes URLs for sports websites. The contextual engine identifies the associated elements to the application, which builds the user interface 116, at least in part, from the identified UI elements 118.

Consider next that the same user then goes to work and connects the same laptop 110 to a network via a TCP/IP connection. In this case, the contextual engine 100 consults the data store 102 and determines that one of the conditions for the context of "at work" is satisfied. The contextual engine concludes, therefore, that the current context is "at work." The contextual engine 100 then causes the application to build the user interface 116 from the UI elements 118 associated with the context of "at work," such as the user's office emailbox, or favorites list that includes URLs for technical websites.

The contextual engine 100 continues to run silently in the background (i.e., without interacting with the user). Whenever the user initiates a new application, the contextual engine 100 provides the application with the UI elements 118 to build the user interface 116 the user has defined for the current context. Additionally, with the contextual engine 100 running in the background, the contextual engine 100 can detect a change in the context of the current user experience. If the contextual engine 100 determines that the current context has changed, the contextual engine 100 determines whether any of the applications currently running on the host computer 110 ("active applications") are affected by the change in context. That is, the contextual engine determines from the data store 102 whether the change in context will necessitate a change in the UI elements 118 used to build the user interface for any of the active applications. If the contextual engine 100 determines that any of the active applications is affected by the change in context, the contextual engine 100 alerts the affected application that it needs to change its user interface 116. The contextual engine 100 then identifies the UI elements 118 associated with the new current context and the affected applications build new user interfaces using the identified elements.

Note that a given user experience can have more than one context. For example, the user could be at home, but working. When more than one context exists for the current user experience, there are likely to be conflicts among the elements. For example, the user might have associated his work emailbox with the context of "at work," and his home emailbox with the context of "at home." If the user is working from home, however, a conflict arises as to which emailbox to provide.

In a preferred embodiment, this conflict is resolved by attempting to determine the user's current role, and to provide a user interface 116 that most nearly fits with the user's current role. To determine the user's current role, each of the conditions is assigned a "weight" and the conditions that are satisfied are weighed against one another. For example, consider the scenario wherein the user is working from home. The user might be logged onto his laptop computer using a docking station and a dial-up connection. The condition of "docked" is satisfied, indicating that the current context is "at work" and that the user's technical favorites should be displayed. On the other hand, the condition of "dial-up connection" is also satisfied, indicating that the user's home favorites should be displayed. In this situation, the contextual engine weighs the conditions to determine the most likely role of the user for the current user experience.

As shown in FIG. 2, the condition "docked" has a higher weight than the condition of "dial-up connection." This means that, if the host computer system is docked, the user is most likely working and, regardless of the type of connection, the contextual engine 100 provides a user interface that coincides with "at work."

In a preferred embodiment, the contextual engine 100 determines the location of the user by considering a number of factors that provide insight into the computer's location. The contextual engine considers factors such as whether the computer is docked or undocked, whether the computer is connected to a network and, if so, whether the connection is via a modem, or via a LAN card, whether the user is logged onto the network, etc. The contextual engine 100 assigns a weight to each of these factors and determines, based on an analysis of the weighted factors, the location of the computer (and, consequently, of the user). For example, if the host computer is docked, the user is connected to a network via a network card, and the user is logged onto the network, the user is most likely at work. Otherwise, the user is most likely not "at work," but roaming.

Figure 3:
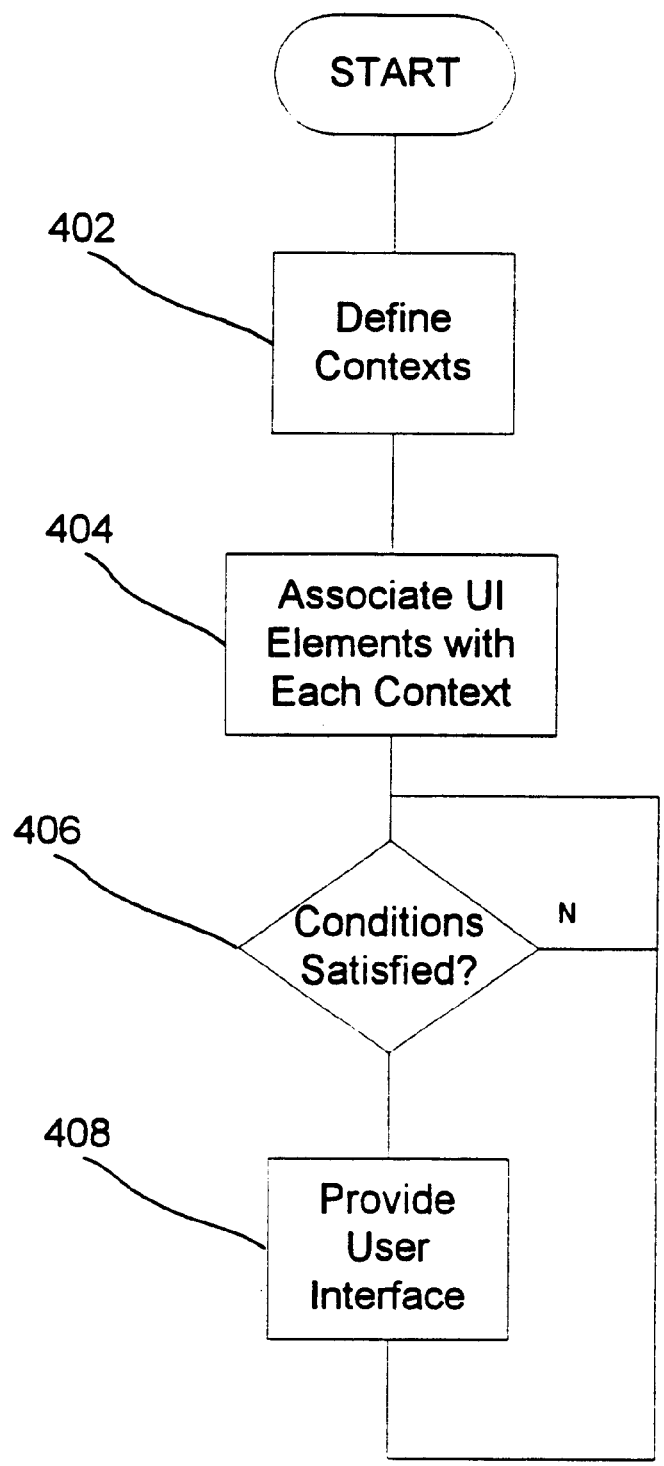
FIG. 3 is a flowchart of a method for building context-based user interfaces in accordance with the present invention.

FIG. 3 is a flowchart of a method 400 for building context-based user interfaces in accordance with the present invention. As shown in FIG. 3, a plurality of contexts are defined at step 402, each of which is defined by a set of conditions. The conditions can be based on the time of day, whether the computer is docked, whether the computer is connected to a network via dial-up modem connection or a TCP/IP connection, etc.

At step 404, each context is associated with a set of UI elements that can be used to build the user interface when the set of conditions that define the context is satisfied. At step 406, a contextual engine running in the background on the host computer system determines, for each context, whether the set of conditions that defines the context is satisfied.

If, at step 406, the set of conditions that defines the context is satisfied, the contextual engine provides, at step 408, a user interface based on the set of UI elements associated with the context. The contextual engine provides the user interface by identifying for an application running on the host computer system, the set of UI elements associated with the context. The application then builds the user interface based on the predefined set of UI elements associated with the context.

The contextual engine continues running in the background on the host computer system and dynamically updates the user interface as the time of day progresses by repeating steps 406 and 408 as long as the user is logged onto the host computer system.

An important feature of the preferred embodiments of the invention is the use of a contextual engine that resides on a host computer system that provides the user with user interfaces based on the context of the current user experience. Moreover, the contextual engine dynamically updates the user interfaces as the current context changes with time. It is understood, however, that the invention is susceptible to various modifications and alternative embodiments. It should be understood that there is no intention to limit the invention to the specific embodiments described herein. On the contrary, the invention is intended to cover all modification, alternative constructions, and equivalents falling within the scope and spirit of the claimed invention.

We claim:

1. A computer readable storage medium having computer-executable instructions for providing a user interface based on a predefined set of user interface (UI) elements that are selected on the basis of a set of prescribed conditions being satisfied, wherein the set of prescribed conditions is associated with a computer on which the user interface is displayed and defines a current context of a user experience associated with the computer, and wherein at least one of the prescribed conditions is based on a current connection status of the computer.

2. The computer readable storage medium of claim 1, wherein at least one of the prescribed conditions is based on whether the computer is connected to a network.

3. The computer readable storage medium of claim 2, wherein at least one of the prescribed conditions is based on whether the computer is connected to a network via a dial-up connection.

4. The computer readable storage medium of claim 2, wherein at least one of the prescribed conditions is based on whether the computer is connected to a network via a TCP/IP connection.

5. The computer readable storage medium of claim 1, wherein at least one of the prescribed conditions is based on whether the computer is docked.

6. The computer readable storage medium of claim 1, further comprising a data store that includes data corresponding to each of a plurality of contexts of user experiences associated with the computer, wherein each said context is defined by a respective set of prescribed conditions and is associated with a respective predefined set of UI elements.

7. The computer readable storage medium of claim 6, having further computer-executable instructions for determining, for a selected context, whether the set of prescribed conditions that defines the selected context is satisfied.

8. The computer readable storage medium of claim 7, having further computer-executable instructions for providing the user interface, if the set of prescribed conditions that define the selected context is satisfied, based on the predefined set of UI elements associated with the selected context.

9. The computer readable storage medium of claim 6, having further computer-executable instructions for determining, for each said context, whether the set of prescribed conditions that defines the context is satisfied.

10. The computer readable storage medium of claim 9, having further computer-executable instructions for providing the user interface, for each said context, if the set of prescribed conditions that defines the context is satisfied, based on the predefined set of UI elements associated with the context.

11. A method for building a context-based user interface on a computer having a data store that includes data corresponding to each of a plurality of contexts of user experiences, wherein each said context is defined by a set of prescribed conditions that are associated with a computer on which the user interface is displayed and is associated with a predefined set of UI elements, and wherein at least one of the prescribed conditions is based on a current connection status of the computer, the method comprising:

determining, for each said context, whether the set of prescribed conditions that defines the context is satisfied;

if the set of prescribed conditions that defines the context is satisfied, providing a user interface based on the predefined set of UI elements associated with the context.

12. The method of claim 11, wherein at least one of the prescribed conditions is based on whether the computer is connected to a network.

13. The method of claim 12, wherein at least one of the prescribed conditions is based on whether the computer is connected to a network via a dial-up connection.

14. The method of claim 12, wherein at least one of the prescribed conditions is based on whether the computer is connected to a network via a TCP/IP connection.

15. The method of claim 12, wherein at least one of the prescribed conditions is based on whether the computer is docked.

16. A computer system for building a context-based user interface, the computer system comprising:

a data store that includes data corresponding to each of a plurality of contexts of user experiences, wherein each said context is defined by a set of prescribed conditions that are associated with a computer on which the user interface is displayed and is associated with a predefined set of UI elements, and wherein at least one of the prescribed conditions is based on a current connection status of the computer; and a contextual engine that determines, for each said context, whether the set of prescribed conditions that defines the context is satisfied, and, if the set of prescribed conditions that defines the context is satisfied, provides a user interface based on the predefined set of UI elements associated with the context.

17. The computer system of claim 16, further comprising an application program, wherein the contextual engine provides the user interface by identifying for the application program, the predefined set of UI elements associated with the context, and wherein the application program builds the user interface based on the predefined set of UI elements associated with the context.

\* \* \* \* \*